(12) United States Patent
Zhang et al.

(10) Patent No.: US 12,578,427 B2
(45) Date of Patent: Mar. 17, 2026

(54) SYSTEMS AND METHODS FOR GENERATING INDEPENDENT TRANSMIT AND RECEIVE CALIBRATION MATRICES FOR MIMO RADAR SYSTEMS

(71) Applicant: Aptiv Technologies AG, Schaffhausen (CH)

(72) Inventors: Yu Zhang, Thousand Oaks, CA (US); Shuimei Zhang, Oak Park, CA (US); Zhengzheng Li, Agoura Hills, CA (US); Xin Zhang, Agoura Hills, CA (US)

(73) Assignee: Aptiv Technologies AG, Schaffhausen (CH)

( * ) Notice: Subject to any disclaimer, the term of this patent is extended or adjusted under 35 U.S.C. 154(b) by 288 days.

(21) Appl. No.: 18/391,240

(22) Filed: Dec. 20, 2023

(65) Prior Publication Data

US 2025/0208256 A1     Jun. 26, 2025

(51) Int. Cl.
*G01S 7/40* (2006.01)
*G01S 13/931* (2020.01)
*G06F 17/16* (2006.01)
*G01S 13/42* (2006.01)

(52) U.S. Cl.
CPC .............. *G01S 7/40* (2013.01); *G01S 13/931* (2013.01); *G06F 17/16* (2013.01); *G01S 13/42* (2013.01)

(58) Field of Classification Search
CPC .......... G01S 7/40; G01S 13/931; G01S 13/42; G01S 2013/9318; G01S 2013/93185; G01S 2013/9319; G01S 7/4017; G01S 7/4026; G06F 17/16
See application file for complete search history.

(56) References Cited

U.S. PATENT DOCUMENTS

| | | | |
|---|---|---|---|
| 11,777,567 B2 | 10/2023 | Li et al. | |
| 2022/0368388 A1* | 11/2022 | Li | H04B 17/11 |
| 2023/0126991 A1 | 4/2023 | Maor et al. | |

OTHER PUBLICATIONS

Extended European Search Report regarding European Patent Application No. 24180529.0, dated Oct. 17, 2024.
Gene H. Golub, and Charles F. Van Loan. "Chapter 12.3 Kronecker Product Computations" in "Matrix Computations, 4th Edition". The Johns Hopkins University Press, 2013.

* cited by examiner

*Primary Examiner* — Vladimir Magloire
*Assistant Examiner* — Ashley Brown Raynal
(74) *Attorney, Agent, or Firm* — Harness, Dickey & Pierce, P.L.C.

(57) ABSTRACT

Systems and method are provided and include receiving a full calibration matrix for a multiple-input multiple-output (MIMO) radar system having N physical transmit channels, M physical receive channels, and N×M virtual transmit-receive channels, the full calibration matrix being an NM×NM complex matrix previously generated based on chamber measurement data. Transmit and receive calibration matrices are determined based on the full calibration matrix, with the transmit calibration matrix being an N×N complex matrix and the receive calibration matrix being an M×M complex matrix. The MIMO radar system uses the calibration values of the transmit and receive calibration matrices to compensate antenna responses to adjust for physical characteristics of the MIMO radar system while performing at least one of ranging and detection of an object in an environment of the MIMO radar system.

17 Claims, 10 Drawing Sheets

402

404

$C$ = NM x NM complex matrix $C_t$ = N x N complex matrix $C_r$ = M x M complex matrix $$Tx_i \ \times \ Rx_j = Rx_iRx_j$$

*Prior Method*

*Prior Method*

402

$C$ = NM x NM complex matrix

404

$C_t$ = N x N complex matrix $C_r$ = M x M complex matrix

690

SYSTEMS AND METHODS FOR GENERATING INDEPENDENT TRANSMIT AND RECEIVE CALIBRATION MATRICES FOR MIMO RADAR SYSTEMS

FIELD

The present disclosure relates to calibration of multiple-input multiple-output (MIMO) radar systems and, more particularly, to systems and methods for generating independent transmit and receive calibration matrices for MIMO radar systems.

BACKGROUND

This section provides background information related to the present disclosure which is not necessarily prior art.

Automotive radar sensors are used in vehicle sensing systems to determine information about objects in the environment of the vehicle, such as the location, size, orientation, velocity, and acceleration of objects in the environment of the vehicle. The sensed information can, for example, be used by other vehicle systems, such as autonomous driving systems and/or advanced driver assistance systems (ADAS), etc., to control steering, braking, throttle, and/or other vehicle systems.

Multiple-input multiple-output (MIMO) radar systems can include multiple transmit channels and multiple receive channels. For example, MIMO radar systems generally include a number of physical channels, including a number of physical transmit channels/antennas and a number of physical receive channels/antennas. The physical channels are mapped to an array of virtual channels. For example, a MIMO system with N physical transmit channels and M physical receive channels forms a virtual array of $N \times M$ transmit-receive channels. For further example, a MIMO radar system with three physical transmit channels and four physical receive channels forms a virtual array of twelve transmit-receive channels. Adding additional physical channels can exponentially increase the number of virtual channels.

Calibration is used to compensate antenna responses during processing to match an ideal antenna array and account for the physical characteristics of the MIMO system, such as mutual coupling, differences in the transmission and receive circuitry, and/or differences in transmission and receive line lengths for each physical channel. Having a large quantity of virtual channels can require large calibration matrices that require a large amount of computing resources, memory, and power. In prior MIMO radar systems, for example, a full calibration matrix C was used and determined as an $NM \times NM$ complex matrix based on chamber measurement data generated based on calibration measurements of the MIMO radar system while operating in a calibration chamber. In the example of a MIMO radar system having three physical transmit channels and four physical receive channels, the full calibration matrix C is a twelve-by-twelve complex matrix determined based on the chamber measurement data. The chamber measurement data can be determined at the time of development and/or manufacture of the MIMO radar system and the full calibration matrix C can be loaded and stored in a memory of the MIMO radar system at the time of manufacture of the MIMO radar system for use by the MIMO radar system while the MIMO radar system is operating in the field.

As described in U.S. Pat. No. 11,777,567, titled "INDEPENDENT TRANSMIT AND RECEIVE CHANNEL CALIBRATION FOR MULTIPLE-INPUT MULTIPLE-OUTPUT (MIMO) SYSTEMS," which is incorporated herein by reference in its entirety, instead of using the full $NM \times NM$ calibration matrix C for calibration of the MIMO radar system, independent and separate transmit and receive matrices $C_t$ and $C_r$ can be determined from the chamber measurement data for the MIMO radar system and used in place of the full calibration matrix C. For example, calibration can be performed by replacing the full $NM \times NM$ calibration matrix C with a transmit matrix $C_t$, which is an $N \times N$ complex matrix, and a receive matrix $C_r$, which is an $M \times M$ matrix. Because the separate and independent transmit and receive matrices, $C_t$ and $C_r$, are smaller than the prior full calibration matrix C, MIMO radar systems utilizing this type of calibration can require less memory and can perform calibration processing for faster, utilizing less computing resources and power, as compared with prior systems that use the full calibration matrix C.

As noted above, the prior method of determining the independent and separate transmit and receive matrices $C_t$ and $C_r$ described in U.S. Pat. No. 11,777,567 utilizes and requires chamber measurement data for the MIMO radar systems. Chamber measurement data, however, may not be available for all MIMO radar systems, such as previously manufactured MIMO radar systems that are already installed and in use in the field, such as in existing vehicles already in the field and in use on the road.

SUMMARY

This section provides a general summary of the disclosure and is not a comprehensive disclosure of its full scope or all of its features.

A method is provided and includes receiving, with at least one processor, a full calibration matrix for a multiple-input multiple-output (MIMO) radar system having N physical transmit channels, M physical receive channels, and $N \times M$ virtual transmit-receive channels, the full calibration matrix being an $NM \times NM$ complex matrix of calibration values previously generated based on chamber measurement data for the MIMO radar system. The method further comprises determining, with the at least one processor, a transmit calibration matrix and a receive calibration matrix based on the full calibration matrix, the transmit calibration matrix being an $N \times N$ complex matrix of calibration values for the MIMO radar system and the receive calibration matrix being an $M \times M$ complex matrix of calibration values for the MIMO radar system. The method further comprises communicating, with the at least one processor, the transmit calibration matrix and the receive calibration matrix to the MIMO radar system. The MIMO radar system uses the calibration values of the transmit calibration matrix and receive calibration matrix to compensate antenna responses to adjust for physical characteristics of the MIMO radar system while performing at least one of ranging and detection of an object in an environment of the MIMO radar system.

In other features, the method includes determining, with the at least one processor, the transmit calibration matrix and the receive calibration matrix includes using singular value decomposition of a permuted version of the full calibration matrix to determine a one-dimensional $N \times N$ array corresponding to a vector version of the transmit calibration matrix and a one-dimensional $M \times M$ array corresponding to a vector version of the receive calibration matrix and reforming the one-dimensional $N \times N$ array and the one-dimensional M×M array into the transmit calibration matrix and the receive calibration matrix, respectively.

In other features, the MIMO radar system is installed in a vehicle and the communicating, with the at least one processor, the transmit calibration matrix and the receive calibration matrix to the MIMO radar system includes wirelessly communicating the transmit calibration matrix and the receive calibration matrix to the MIMO radar system.

In other features, the full calibration matrix is previously stored in a memory of the MIMO radar system during manufacture of the MIMO radar system and, upon receiving the transmit calibration matrix and the receive calibration matrix, the MIMO radar system removes the full calibration matrix from the memory of the MIMO radar system and stores the transmit calibration matrix and the receive calibration matrix in the memory of the MIMO radar system.

In other features, the method includes determining, with the at least one processor, the transmit calibration matrix and the receive calibration matrix based on a nearest Kronecker product (NKP) problem that includes minimizing the following function with respect to the transmit calibration matrix and the receive calibration matrix:

$$f(C_t, C_r) = \|C - C_t \otimes C_r\|_F$$

wherein C is the full calibration matrix, $C_t$ is the transmit calibration matrix, and $C_r$ is the receive calibration matrix.

In other features, the physical characteristics of the MIMO radar system include at least one of mutual coupling of transmit/receive components of the MIMO radar system, differences in transmission and receive circuitry of the MIMO radar system, and differences in transmission and receive line lengths for each of the N physical transmit channels and the M physical receive channels.

A system is also provided and includes at least one processor and memory configured to receive a full calibration matrix for a multiple-input multiple-output (MIMO) radar system having N physical transmit channels, M physical receive channels, and N×M virtual transmit-receive channels, the full calibration matrix being an NM×NM complex matrix of calibration values previously generated based on chamber measurement data for the MIMO radar system. The at least one processor and memory are further configured to determine a transmit calibration matrix and a receive calibration matrix based on the full calibration matrix, the transmit calibration matrix being an N×N complex matrix of calibration values for the MIMO radar system and the receive calibration matrix being an M×M complex matrix of calibration values for the MIMO radar system. The at least one processor and memory are further configured to communicate the transmit calibration matrix and the receive calibration matrix to the MIMO radar system. The MIMO radar system uses the calibration values of the transmit calibration matrix and receive calibration matrix to compensate antenna responses to adjust for physical characteristics of the MIMO radar system while performing at least one of ranging and detection of an object in an environment of the MIMO radar system.

In other features, the at least one processor and memory are further configured to determine the transmit calibration matrix and the receive calibration matrix by using singular value decomposition of a permuted version of the full calibration matrix to determine a one-dimensional N×N array corresponding to a vector version of the transmit calibration matrix and a one-dimensional M×M array corresponding to a vector version of the receive calibration matrix and reforming the one-dimensional N×N array and the one-dimensional M×M array into the transmit calibration matrix and the receive calibration matrix, respectively.

In other features, the MIMO radar system is installed in a vehicle and the at least one processor and memory are configured to communicate the transmit calibration matrix and the receive calibration matrix to the MIMO radar system by wirelessly communicating the transmit calibration matrix and the receive calibration matrix to the MIMO radar system.

In other features, the full calibration matrix is previously stored in a memory of the MIMO radar system during manufacture of the MIMO radar system and, upon receiving the transmit calibration matrix and the receive calibration matrix, the MIMO radar system removes the full calibration matrix from the memory of the MIMO radar system and stores the transmit calibration matrix and the receive calibration matrix in the memory of the MIMO radar system.

In other features, the at least one processor and memory are further configured to determine the transmit calibration matrix and the receive calibration matrix based on a nearest Kronecker product (NKP) problem that includes minimizing the following function with respect to the transmit calibration matrix and the receive calibration matrix:

$$f(C_t, C_r) = \|C - C_t \otimes C_r\|_F$$

wherein C is the full calibration matrix, $C_t$ is the transmit calibration matrix, and $C_r$ is the receive calibration matrix.

In other features, the physical characteristics of the MIMO radar system include at least one of mutual coupling of transmit/receive components of the MIMO radar system, differences in transmission and receive circuitry of the MIMO radar system, and differences in transmission and receive line lengths for each of the N physical transmit channels and the M physical receive channels.

Another method of updating calibration data stored in a memory of a multiple-input multiple-output (MIMO) radar system having N physical transmit channels, M physical receive channels, and N×M virtual transmit-receive channels, the calibration data including a full calibration matrix, the full calibration matrix being an NM×NM complex matrix of calibration values previously generated based on chamber measurement data for the MIMO radar system is provided. The method includes receiving, with at least one processor, the full calibration matrix for MIMO radar system and determining, with the at least one processor, a transmit calibration matrix and a receive calibration matrix based on the full calibration matrix, the transmit calibration matrix being an N×N complex matrix of calibration values for the MIMO radar system and the receive calibration matrix being an M×M complex matrix of calibration values for the MIMO radar system. The method further includes communicating, with the at least one processor, the transmit calibration matrix and the receive calibration matrix to the MIMO radar system. The method further includes communicating, with the at least one processor, updated operating code that configures the MIMO radar system to perform calibration using the transmit calibration matrix and the receive calibration matrix to the MIMO radar system. The MIMO radar system uses the calibration values of the transmit calibration matrix and receive calibration matrix to compensate antenna responses to adjust for physical characteristics of the MIMO radar system while performing at least one of ranging and detection of an object in an environment of the MIMO radar system. In response to receiving the transmit calibration matrix and the receive calibration matrix, the MIMO radar system is configured to remove the full calibration matrix from the calibration data stored in the memory and to store the transmit calibration matrix and the receive calibration matrix in the memory. In response to receiving the updated operating code, the MIMO radar system is configured to install the updated operation code to perform calibration using the transmit calibration matrix and the receive calibration matrix to the MIMO radar system.

In other features, the determining, with the at least one processor, the transmit calibration matrix and the receive calibration matrix is performed by using singular value decomposition of a permuted version of the full calibration matrix to determine a one-dimensional N×N array corresponding to a vector version of the transmit calibration matrix and a one-dimensional M×M array corresponding to a vector version of the receive calibration matrix and reforming the one-dimensional N×N array and the one-dimensional M×M array into the transmit calibration matrix and the receive calibration matrix, respectively.

In other features, the MIMO radar system is installed in a vehicle and the communicating, with the at least one processor, the transmit calibration matrix and the receive calibration matrix to the MIMO radar system includes wirelessly communicating the transmit calibration matrix and the receive calibration matrix to the MIMO radar system.

In other features, the determining, with the at least one processor, the transmit calibration matrix and the receive calibration matrix is performed based on a nearest Kronecker product (NKP) problem that includes minimizing the following function with respect to the transmit calibration matrix and the receive calibration matrix:

$$f(C_t, C_r) = \|C - C_t \otimes C_r\|_F$$

wherein C is the full calibration matrix, $C_t$ is the transmit calibration matrix, and $C_r$ is the receive calibration matrix.

In other features, the physical characteristics of the MIMO radar system include at least one of mutual coupling of transmit/receive components of the MIMO radar system, differences in transmission and receive circuitry of the MIMO radar system, and differences in transmission and receive line lengths for each of the N physical transmit channels and the M physical receive channels.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
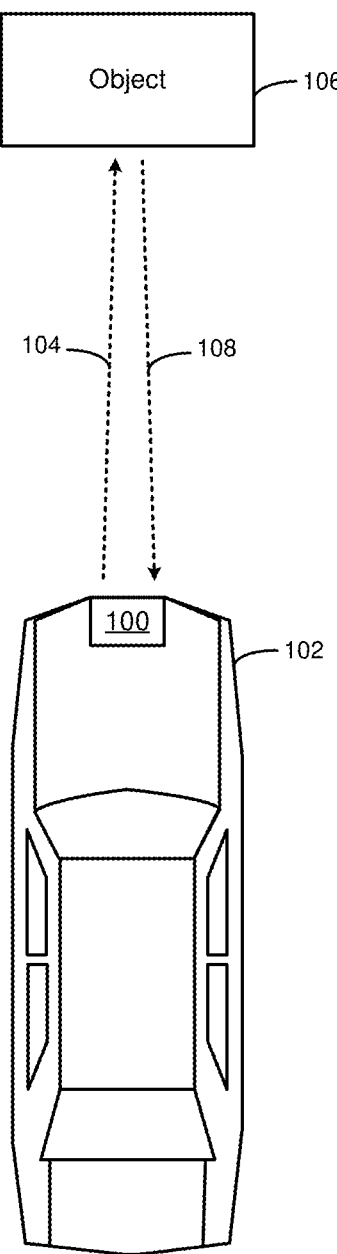
FIG. 1 is a block diagram of a vehicle having a radar system in accordance with the present disclosure.

Example embodiments will now be described more fully with reference to the accompanying drawings.

The present disclosure provides methods and systems for determining independent transmit and receive matrices, $C_t$ and $C_r$, for a MIMO radar system based on an existing, known, and previously determined full calibration matrix C for the MIMO radar system, without the need to reference or generate chamber measurement data for the MIMO radar system. In this way, the independent transmit and receive matrices, $C_t$ and $C_r$, for existing MIMO radar systems can be determined for previously manufactured MIMO radar systems that are already in the field and in use without the need to generate or determine new chamber measurement data for the MIMO radar system. Because the existing full calibration matrix C for the MIMO radar system is already known and stored in the MIMO radar system and/or archived by the MIMO radar system manufacturer or developer, the independent transmit and receive matrices, $C_t$ and $C_r$, can be developed based on the existing full calibration matrix C for the MIMO radar system. The MIMO radar system in the field can then be updated with a software update to replace the full calibration matrix C stored in memory with the independent transmit and receive matrices, $C_t$ and $C_r$. In addition, the processing software stored in the memory of the MIMO radar system can be updated with new processing software to calibrate and compensate the antenna responses of the MIMO radar system based on the independent transmit and receive matrices, $C_t$ and $C_r$.

As discussed above, U.S. Pat. No. 11,777,567, describes a method of decoupling one-way transmit (TX) antenna responses and receive (RX) antenna responses from two-way MIMO responses. In particular, independent calibration matrices for TX channels and RX channels can be generated, respectively, based on chamber measurement data. For example, for a MIMO radar system having NTX antennas and M RX antennas, instead of generating a full NM×NM calibration matrix for the virtual channels, the algorithm generates an N×N calibration matrix for the TX antennas and an M×M calibration matrix for the RX antennas.

For a MIMO radar system having N transmit channels and M receive channels, assuming $x(\theta)$ is the channel response for a target at angle $\theta$, chamber measurement data for the MIMO radar system can be determined as an NM×1 complex vector with $x_{n,m}$ being the channel response from the nth TX antenna and the mth RX antenna, as shown here:

$$x(\theta) = \begin{bmatrix} x_{1,1} \\ x_{1,2} \\ \vdots \\ x_{1,M} \\ x_{2,1} \\ x_{2,2} \\ \vdots \\ x_{2,M} \\ \vdots \\ \vdots \\ \vdots \\ x_{N,1} \\ x_{N,2} \\ \vdots \\ x_{N,M} \end{bmatrix} \qquad \text{Equation 1}$$

The channel response $x(\theta)$ can then be reshaped to an N×M data matrix $X(\theta)$ based on Equation 2:

$$x(\theta) = vec\,(X(\theta)) = vec\left(\begin{bmatrix} x_{1,1} & x_{2,1} & \cdots & x_{n,1} \\ x_{1,2} & x_{2,2} & \cdots & x_{N,2} \\ \vdots & \vdots & \ddots & \vdots \\ x_{1,M} & x_{2,M} & \cdots & x_{N,M} \end{bmatrix}\right) \qquad \text{Equation 2}$$

where the mth row of $X(\theta)$ is the TX channel response for the mth RX, and the nth column of $X(\theta)$ is the RX channel response for the nth TX.

As described in U.S. Pat. No. 11,777,567, if isolation between the TX and RX antennas is very good, $X(\theta)$ can be approximated by Equation 3:

$$X(\theta) \cong x_r(\theta) \cdot x_t(\theta)^T \qquad \text{Equation 3}$$

where $x_r(\theta)$ and $x_t(\theta)$ are the response vectors for the RX and TX antennas, respectively.

Estimating $x_r(\theta)$ and $x_t(\theta)$ is equivalent to finding a nearest rank-1 matrix to $X(\theta)$ using singular value decomposition (SVD) by Equation 4:

$$X(\theta) = \sum_{k=1}^{min(N,M)} \sigma_k u_k v_k^T \qquad \text{Equation 4}$$

where $\sigma_1$ is the largest singular value and $u_1$ and $v_1$ are corresponding left and right singular vectors. Further, $u_1$ and $v_1$ can be used to approximate normalized vectors from $x_r(\theta)$ and $x_t(\theta)$ and the calibration matrix $C_r$ for RX antennas and the calibration matrix $C_t$ for TX antennas can then be computed.

In the above methodology, the algorithm generates the TX calibration matrix $C_t$ and RX calibration matrix $C_r$ based on the chamber measurement data.

For any new MIMO radar systems being developed, the chamber measurement data can be determined and used to generate the TX and RX independent calibration matrices, as described above.

For existing MIMO radar systems already in use and in the field, chamber measurement data may no longer be available and only the conventional full calibration matrix C for those MIMO radar systems may be available. In addition, it may be impractical and cost prohibitive to remove the existing MIMO radar systems from the field to determine and generate the chamber measurement data necessary to determine the independent TX and RX calibration matrices, $C_t$ and $C_r$, using the prior methodology.

As such, the present disclosure provides a methodology generate the TX and RX independent calibration matrices, $C_t$ and $C_r$, from the existing full calibration matrix C without the use of chamber measurement data and without the need to determine or generate chamber measurement for the MIMO radar system. In particular, the systems and methods of the present disclosure utilize the conventional full calibration matrix C, which is an NM×NM complex matrix of calibration values, as input and generates as output the calibration matrix $C_t$ for TX antennas, which is an N×N complex matrix of calibration values, and the calibration matrix $C_r$ for RX antennas, which is an M×M complex matrix of calibration values.

Figure 2:
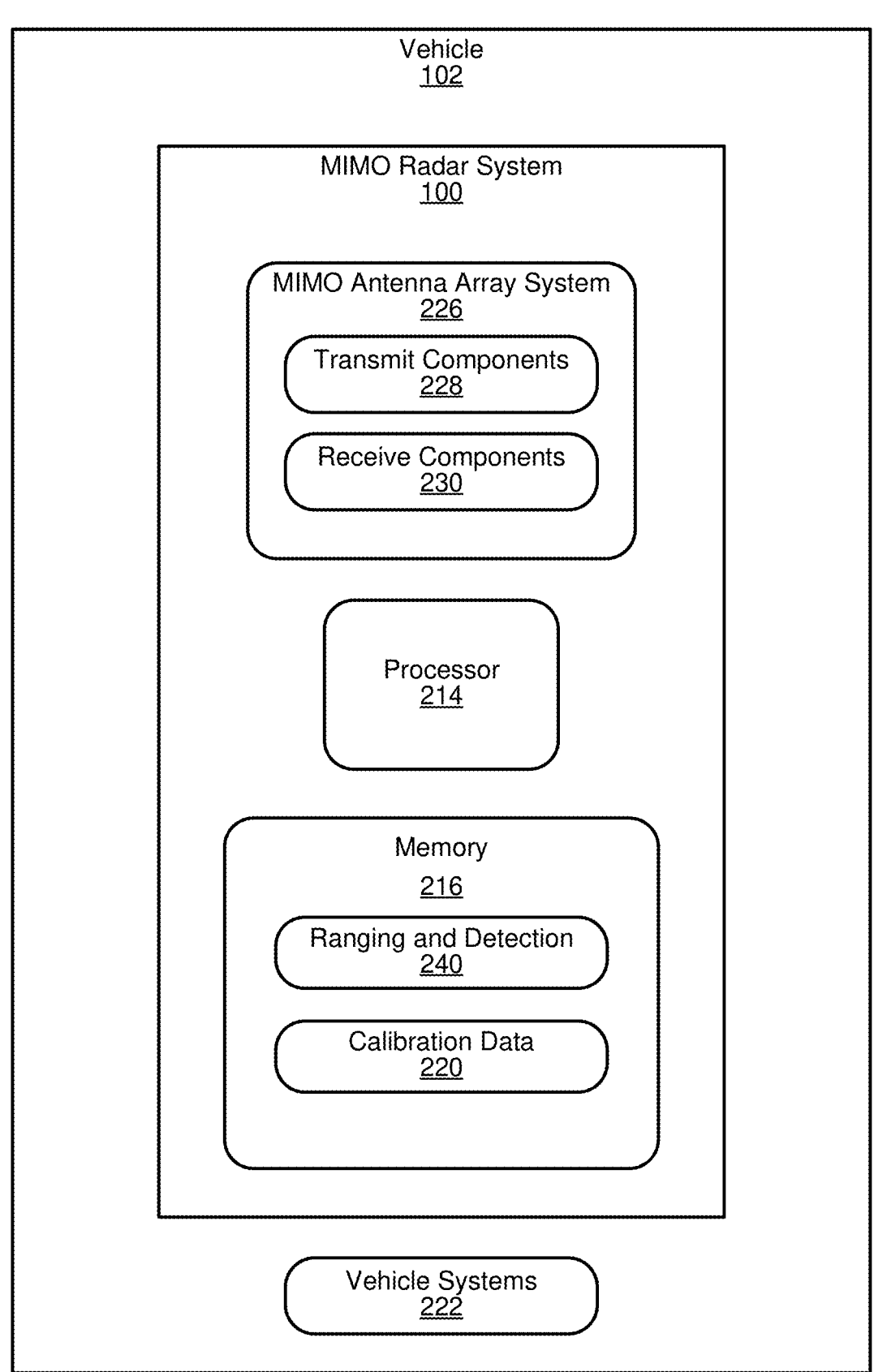
FIG. 2 is another block diagram of a vehicle having a radar system in accordance with the present disclosure.

With reference to FIGS. 1 and 2, a MIMO radar system 100 of a vehicle 102 in accordance with the present disclosure is shown. The radar system 100 transmits signals 104 that are reflected off of an object 106 in the environment of the vehicle 102. The radar system 100 receives signals 108 that are reflected off the object 106. Based on characteristics of the received signals 108, the radar system 100 determines information about the object, such as the location, size, orientation, velocity and acceleration of the object 106.

The radar system 100 includes a processor 214 and memory 216 that stores code executed by the processor to perform the required functionality for transmitting and receiving signals 104, 108 and determining information about the object 106 based on the characteristics of the received signals 108. While the example implementation illustrates a single processor 214, multiple processors and/or modules working together can alternatively be used. The radar system 100 includes a MIMO antenna array system 226 having transmit components 228, including TX antennas, and receive components 230, including RX antennas, which are discussed in further detail below. The memory 216 stores ranging and detection code 240 executed by the processor 214 to perform ranging and detection of objects, such as object 106, in the environment of the vehicle 102. The memory 216 also stores calibration data 220 used by the processor to process received signals and compensate antenna responses to match an ideal antenna array and to account for the physical characteristics of the MIMO radar system 100, such as mutual coupling of the transmit and/or receive components of the MIMO radar system 100, differences in the transmission and receive circuitry, and/or differences in transmission and receive line lengths for each physical channel, etc. For example, in accordance with the present disclosure and as discussed in further detail below, the processor 214 uses independent transmit and receive matrices, $C_t$ and $C_r$, stored as calibration data 220 in the memory 216 to correct data transmitted and received by the MIMO antenna array system 226. For example, the transmit matrix, $C_t$, is used by the processor 214 to correct the transmit components 228 and the receive matrix, $C_r$, is used to correct the receive components 230, with each correction being made to approximate an ideal steering beam transmitted and received by the MIMO antenna array system 226.

In this way, the calibration matrices, $C_t$ and $C_r$, improve the accuracy of the MIMO radar system 100 to account for the radar system 100.

The processor 214 can communicate the information about the object 106, such as the location, size, orientation, velocity and acceleration of the object 106, to other vehicle systems 222, such as autonomous driving systems and/or advanced driver assistance systems (ADAS), etc. The other vehicle systems can then utilize and process the information about the object 106 to appropriately control steering, braking, throttle, and/or other vehicle operations of the vehicle 102 based on the information about the object 106.

The transmit components 228 include one or more physical transmit channels, e.g., transmit antennas, transmitters, coupling circuitry, etc., and the receive components 230 include one or more physical receive channels, e.g., receive antennas, receivers, coupling circuitry, etc. Together, the physical transmit channels and the physical receive channels can be combined to form an array of virtual channels. The quantity of virtual channels in the array depends on the quantity of physical transmit and receive channels. A greater quantity of physical transmit and receive channels can form a larger array of virtual channels. Calibrating a large array of virtual channels using a full calibration matrix may require much more computations, processing, and memory than calibrating the physical transmit and receive channels with their own respective calibration matrices.

Figure 3:
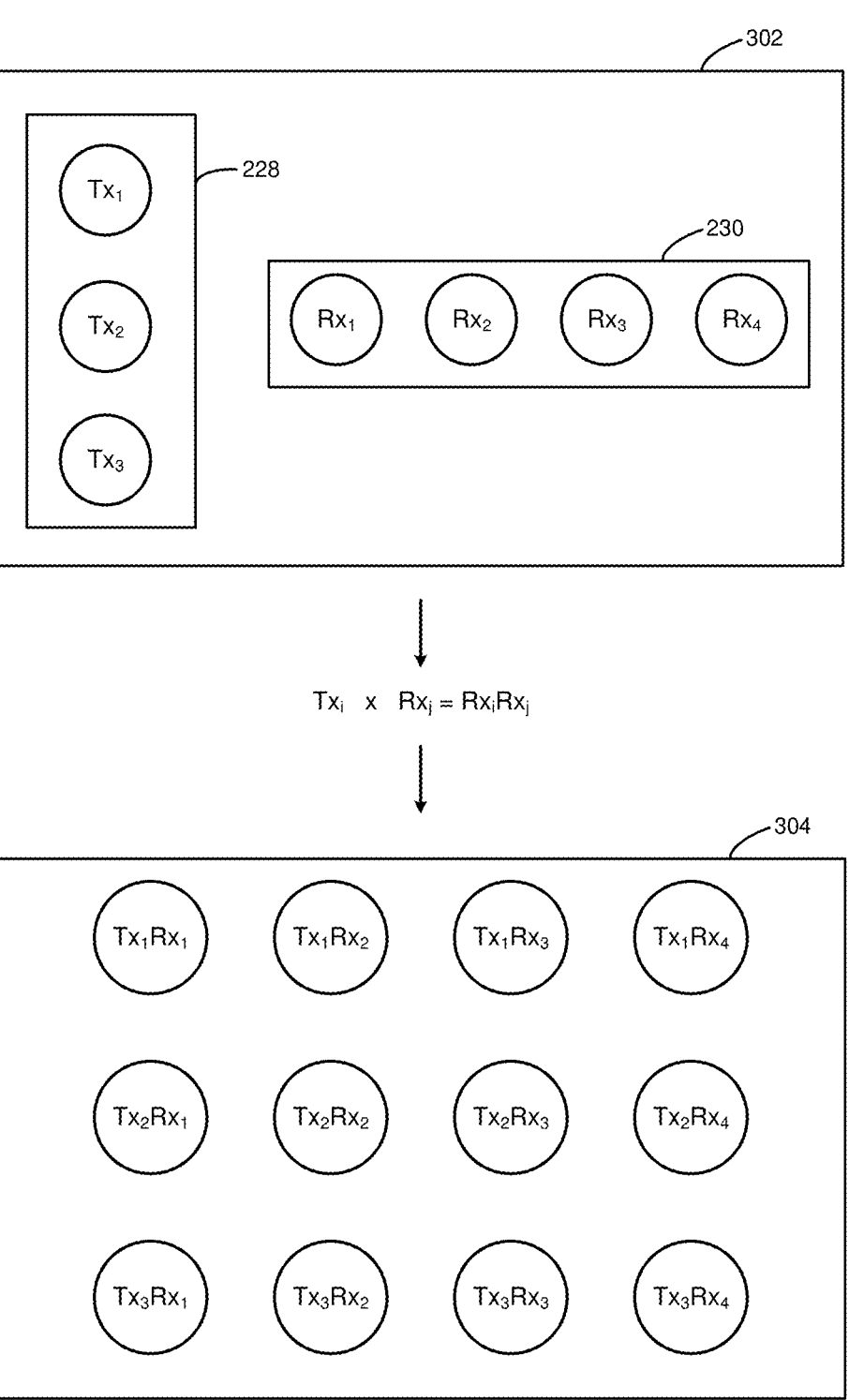
FIG. 3 is a diagram illustrating a relationship between physical channels and virtual channels for a MIMO radar system in accordance with the present disclosure.

FIG. 3 illustrates a relationship between the physical channels 302 of the MIMO Antenna Array System, including transmit components 228 and receive components 230, and virtual channels 304 for a MIMO radar system 100 in accordance with the present disclosure. The transmit components 228 include one or more physical transmit channels $Tx_1$ to $Tx_3$ and one or more physical receive channels Rx1 to $Rx_4$. While the example of FIG. 3 illustrates three physical transmit channels $Tx_1$ to $Tx_3$ and four physical receive channels Rx1 to $Rx_4$, any number of physical transmit channels and physical receive channels can be used in accordance with the present disclosure. Further, the number of physical transmit channels and physical receive channels can be the same or different quantities.

The number of virtual transmit-receive channels 304 is determined by multiplying the number of physical transmit channels by the number of physical receive channels. In the example of FIG. 3, the three physical transmit channels $Tx_1$ to $Tx_3$ and the four physical receive channels Rx1 to $Rx_4$ yields twelve virtual channels 304 $Tx_1Rx_1$ through $Tx_3Rx_4$, which is the product of the three physical transmit channels and the four physical receive channels.

The channel response of each virtual channel 304 measures a round trip of the electromagnetic energy transmitted and received by the associated physical transmit and receive channels for that virtual channel. Therefore, the channel response of each virtual channel 304 includes a transmit component and a receive component for mutual coupling that is equal to the mutual coupling between the associated physical transmit channel and the physical receive channel. For example, the mutual coupling of the virtual channel $Tx_2Rx_2$ is affected by the physical neighboring channels of $Tx_2$ and $Rx_2$, and the mutual coupling of the virtual channel $Tx_3Rx_2$ is affected by the physical neighboring channels of $Tx_3$ and $Rx_2$. The receive component of the mutual coupling of these two virtual channels is the same, i.e., the mutual coupling component due to $Rx_2$, but the transmit component of the mutual coupling of these two virtual channels is different. $Tx_2Rx_2$ has a transmit component associated with $Tx_2$, and $Tx_3Rx_2$ has a transmit component associated with $Tx_3$. Further, neighboring virtual channels, e.g., $Tx_2Rx_2$ and $Tx_3Rx_2$, can have a greater combined mutual coupling than virtual channels that are further apart, e.g., $Tx_1Rx_1$ and $Tx_4Rx_4$. The techniques and systems of the present disclosure separate the transmit and receive components of mutual coupling for each virtual channel in order to calibrate the physical transmit and receive channel arrays using respective calibration matrices for each physical array. The combined quantity of elements of the N×N transmit calibration matrix $C_t$ for the transmit channel array $Tx_1$ to $Tx_N$ and the M×M receive calibration matrix $C_r$ for the receive channel array $Rx_1$ to $Rx_M$ is significantly less than the quantity of elements in a full NM×NM calibration matrix C for all of the virtual channels 304.

Figure 4A:
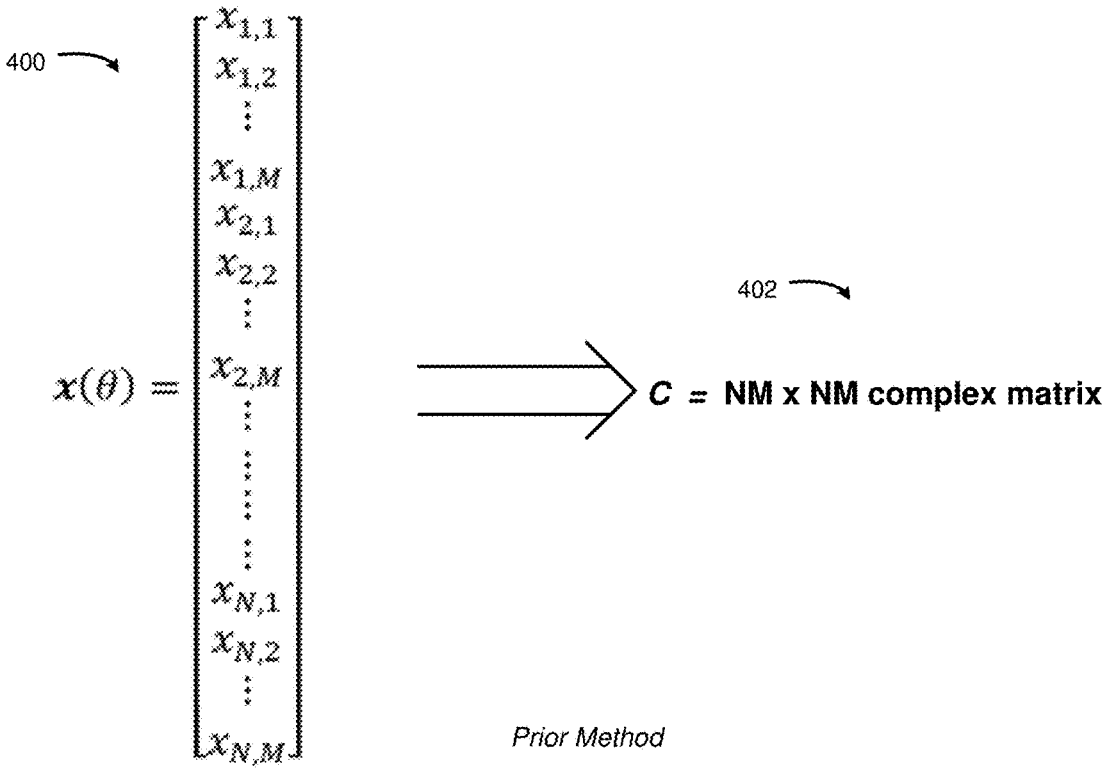
FIG. 4A illustrates a prior method of determining a full calibration matrix for a MIMO radar system.
Figure 4B:
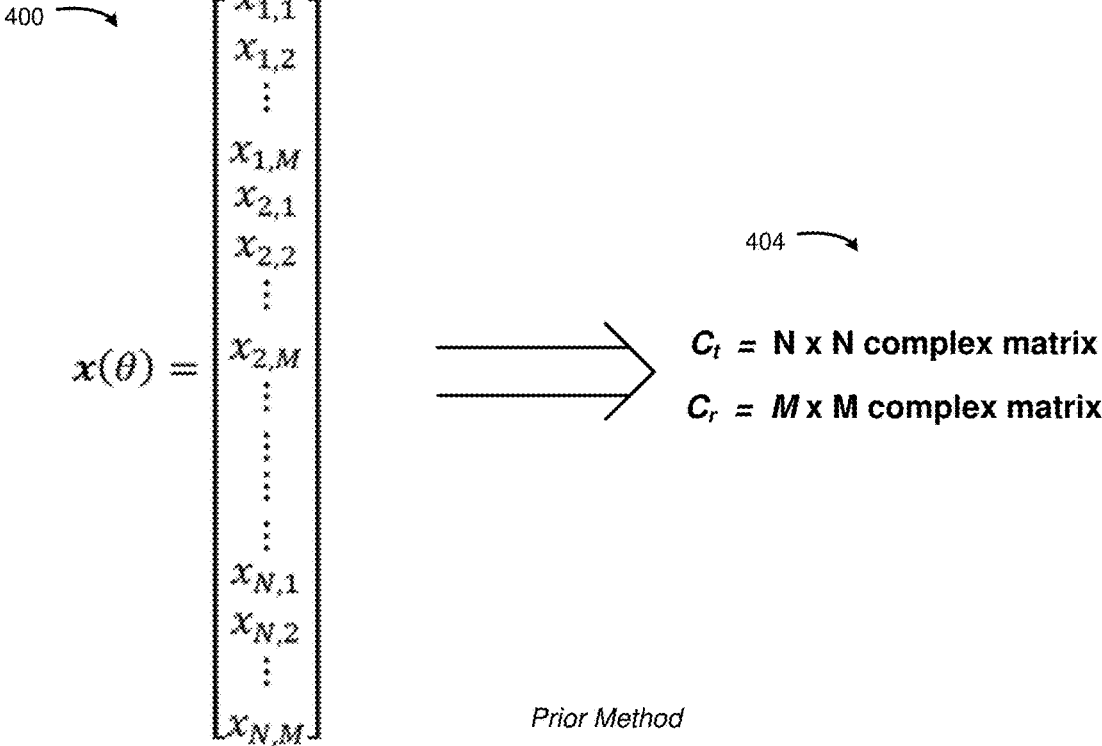
FIG. 4B illustrates a prior method of determining independent transmit and receive calibration matrices for a MIMO radar system.

With reference to FIG. 4A, as noted above, prior radar systems used chamber measurement data 400 to determine the complex NM×NM full calibration matrix C 402. In FIGS. 4A and 4B, the chamber measurement data 400 is represented as the NM×1 complex vector discussed above with reference to Equation 1, with x(θ) being the channel response for a target at angle θ, and $x_{n,m}$ being the channel response from the nth TX antenna and the mth RX antenna. With reference to FIG. 4B, as noted above U.S. Pat. No. 11,777,567 describe a methodology to determine independent transmit and receive calibration matrices 404 from the chamber measurement data 400. As shown in FIG. 4B, the independent transmit and receive calibration matrices 404 include $C_t$, which is an N×N complex matrix and $C_r$, which is an M×M complex matrix.

Figure 5:
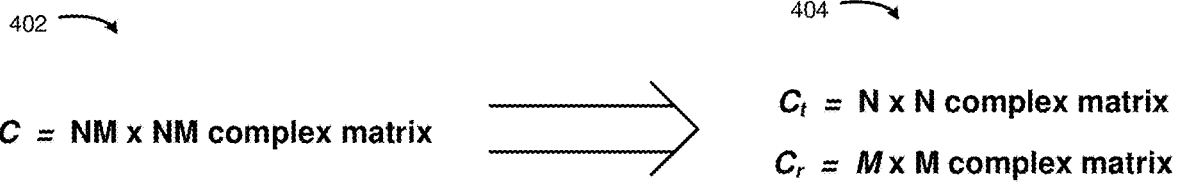
FIG. 5 illustrates a method of determining independent transmit and receive calibration matrices for a MIMO radar system in accordance with the present disclosure.

As shown in FIG. 5, the present disclosure provides a methodology to determine the independent transmit and receive calibration matrices 404, $C_t$ and $C_r$, directly from the full calibration matrix C, without the need to reference, determine, or generate chamber measurement data 400 for the MIMO radar system.

In particular, the present methodology starts with the full calibration matrix C for the MIMO radar system 100 as input. For a given MIMO array response x(θ) at an angle θ, based on the conventional full calibration matrix C, the calibrated array response is determined based on Equation 5:

$$y(\theta) = C \cdot x(\theta) = C \cdot vec\left(X(\theta)\right) \qquad \text{Equation 5}$$

Because $X(\theta) = x_r(\theta) \cdot x_t(\theta)^T$, if the TX array calibration matrix $C_t$ and RX array calibration matrix $C_r$ are known, the calibration array response can also be approximated as Equation 6:

$$y(\theta) \cong vec\left((C_r \cdot x_r(\theta)) \cdot (C_t \cdot x_t(\theta))^T\right) = \qquad \text{Equation 6}$$

$$vec\left(C_r \cdot \left(x_r(\theta) \cdot x_t(\theta)^T\right) \cdot C_t^T\right) \cong vec\left(C_r \cdot X(\theta) \cdot C_t^T\right) =$$

$$(C_t \otimes C_r) \cdot vec\left(X(\theta)\right)$$

Comparing the above equations above, yields Equation 7:

$$C \cdot vec\left(X(\theta)\right) \cong (C_t \otimes C_r) \cdot vec\left(X(\theta)\right) \qquad \text{Equation 7}$$

Removing the common terms on each side of Equation 7 reduces Equation 7 to Equation 8:

$$C \cong C_t \otimes C_r \qquad \text{Equation 8}$$

where C is the NM×NM complex calibration matrix, $C_t$ for the TX components is an N×N complex calibration matrix and $C_r$ for the RX components is an M×M complex calibration matrix.

Estimating $C_t$ and $C_r$ from the existing full calibration matrix C is a nearest Kronecker product (NKP) problem, which involves minimizing the following function (Equation 9) with respect to $C_t$ and $C_r$:

$$f(C_t, C_r) = \|C - C_t \otimes C_r\|_F \qquad \text{Equation 9}$$

The NKP problem can be solved by the singular value decomposition (SVD) of a permuted version of C. Solving NKP problems is described, for example, in Chapter 12.3.6 titled "The Kronecker Product SVD" of "Matrix Computation, $4^{th}$ Edition," by Gene H. Golub and Charles F. Van Loan and published by The Johns Hopkins University Press, 2013.

Accordingly, the matrix C can be treated as blocks of sub-matrix, as shown by Equation 10:

$$C = \begin{bmatrix} C_{1,1} & C_{1,2} & \dots & C_{1,N} \\ C_{2,1} & C_{2,2} & \dots & C_{2,N} \\ \vdots & \vdots & \ddots & \vdots \\ C_{N,1} & C_{N,2} & \dots & C_{N,N} \end{bmatrix} \qquad \text{Equation 10}$$

where each $C_{i,j}$ is an M×M complex matrix.

For the jth column of the blocks, an N×M² complex matrix is defined according to Equation 11:

$$\hat{C}_j = \begin{bmatrix} (vec(C_{1,j}))^T \\ (vec(C_{2,j}))^T \\ \vdots \\ (vec(C_{N,j}))^T \end{bmatrix} \qquad \text{Equation 11}$$

Then an N²×M² complex matrix can be formed according to Equation 12:

$$\hat{C} = \begin{bmatrix} \hat{C}_1 \\ \hat{C}_2 \\ \vdots \\ \hat{C}_N \end{bmatrix} \qquad \text{Equation 12}$$

The optimization problem discussed above with respect to Equation 9 can then be rewritten according to Equation 13:

$$\min_{C_t,C_r}\|C - C_t \otimes C_r\|_F \equiv \min_{C_t,C_r}\|\hat{C} - vec(C_t)\cdot(vec(C_r))^T\|_F \qquad \text{Equation 13}$$

In Equation 13, $vec(C_t)$ and $vec(C_r)$ correspond to the vector versions of $C_t$ and $C_r$, respectively. The new minimization problem is equivalent to finding a nearest rank-1 matrix to C. This problem can be solved by SVD according to Equation 14:

$$\hat{C} = \sum_{k=1}^{min(N^2,M^2)}\hat{\sigma}_k \tilde{u}_k \tilde{v}_k^T \qquad \text{Equation 14}$$

where $\tilde{\sigma}_1$ is the largest or dominant singular value and $\tilde{u}_1$ and $\tilde{v}_1$ are corresponding one-dimensional singular vectors. In particular, $\tilde{u}_1$ is a one-dimensional N²×1 vector and $\tilde{v}_1$ is a one-dimensional M²×1 vector. The square root of the largest or dominant singular value $\tilde{\sigma}_1$ can then be used for magnitude by multiplying each of the $\tilde{u}_1$ and $\tilde{\sigma}_1$ vectors to approximate $vec(C_t)$ and $vec(C_r)$, respectively. In other words, $$\sqrt{\tilde{\sigma}_1}$$

$\tilde{u}_1$ and $$\sqrt{\tilde{\sigma}_1}$$

Figure 8:
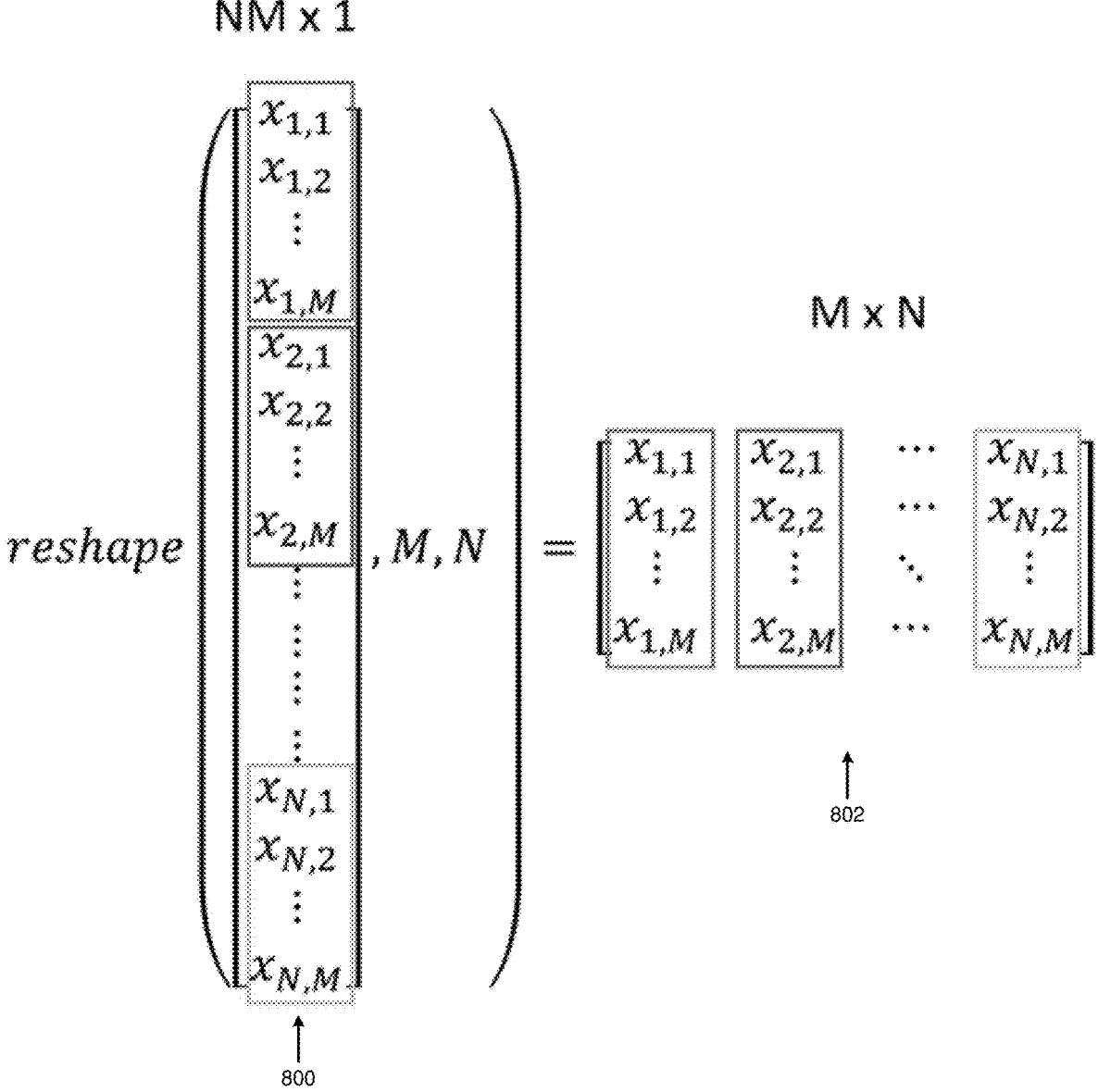
FIG. 8 illustrates a reshape function that reforms an NM×1 vector into an M×N matrix.
Figure 9:
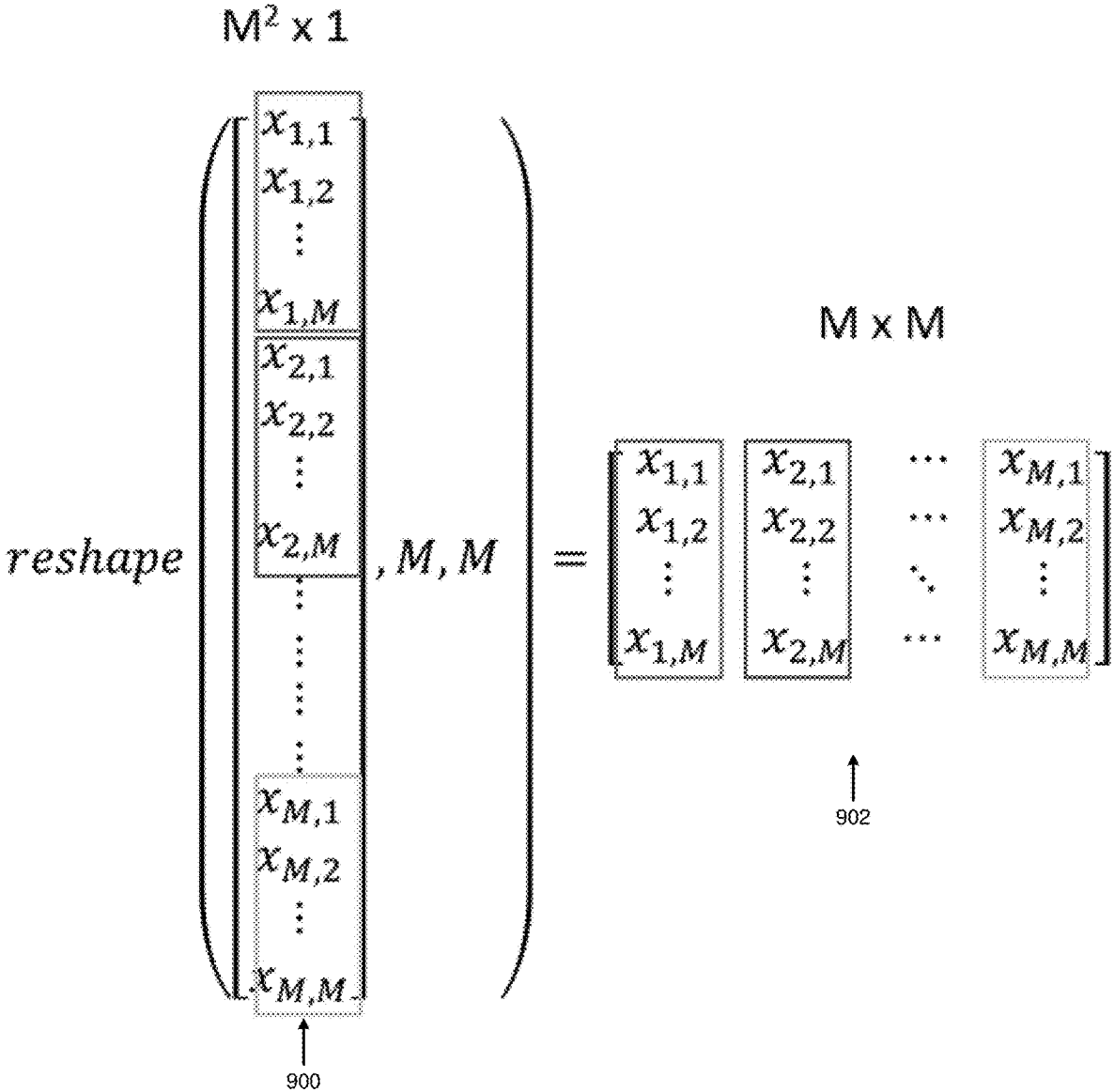
FIG. 9 illustrates a reshape function that reforms an $M^2 \times 1$ vector into an M×M matrix.
Figure 10:
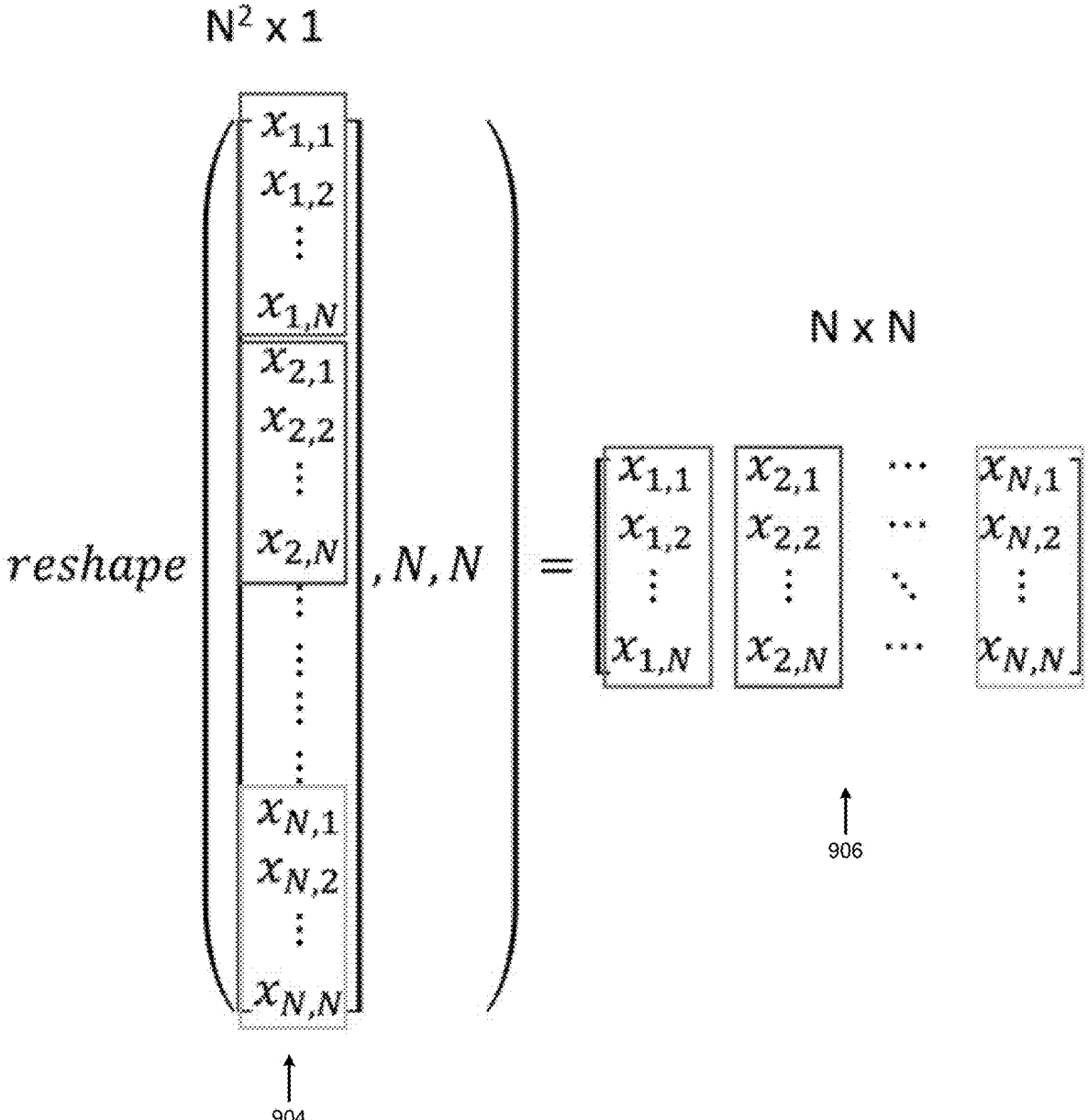
FIG. 10 illustrates a reshape function that reforms an $N^2 \times 1$ vector into an N×N matrix.

$\tilde{v}_1$ can be used to approximate $vec(C_t)$ and $vec(C_r)$, respectively. $C_t$ and $C_r$ can then be determined by reforming $vec(C_t)$ and $vec(C_r)$ into the corresponding $C_t$ and $C_r$ matrices. For example, a reshape function can be used to reform the one-dimensional vectors into the corresponding matrices. With reference to FIG. 8, the reshape function can take as arguments a one-dimensional array, shown at 800, and along with arguments indicating the dimensions of the matrix to be formed from the one-dimensional array. In the example of FIG. 8, the one-dimensional array is an NM×1 array and the dimensions of the matrix to be formed are M and N. As shown in FIG. 8, the first M elements of the array 800 are mapped to the first column of the resulting matrix, the second M elements are mapped to the second column of the matrix, and so on. In this way, the one-dimensional NM×1 array 800 is reformed into an M×N matrix 802. Similarly, with reference to FIG. 9, an M²×1 one-dimensional matrix 900 is illustrated as being reformed using the reshape function into an M×M matrix 902. Further, with reference to FIG. 10, an N²×1 one-dimensional matrix 904 is illustrated as being reformed using the reshape function into an N×N matrix 906. In the present example, the one-dimensional arrays $$\sqrt{\tilde{\sigma}_1}$$

$\tilde{u}_1$ and $$\sqrt{\tilde{\sigma}_1}$$

$\tilde{v}_1$ (i.e., $vec(C_t)$ and $vec(C_r)$ can be reformed into $C_t$ and $C_r$, respectively using the reshape function according to Equations 15 and 16:

$$C_t = \text{reshape}\left(\sqrt{\tilde{\sigma}_1}\cdot\tilde{u}_1, N, N\right) \qquad \text{Equation 15}$$

$$C_r = \text{reshape}\left(\sqrt{\tilde{\sigma}_1}\cdot\tilde{v}_1, M, M\right) \qquad \text{Equation 16}$$

With $\tilde{\sigma}_1$ being the dominant singular value as discussed above, with $$\sqrt{\tilde{\sigma}_1}$$

$\tilde{u}_1$ being the one-dimensional N×N array corresponding to vec($C_t$), and with $$\sqrt{\tilde{\sigma}_1}$$

$\tilde{v}_1$ being the one-dimensional M×M array corresponding to vec($C_r$).

According to the above methodology of the present disclosure, the independent transmit and receive calibration matrices, $C_t$ and $C_r$, can be directly determined and derived from the full calibration matrix C for a particular MIMO radar system 100, without the need to reference, determine, or generate chamber measurement data for the MIMO radar system.

Once the independent transmit and receive calibration matrices, $C_t$ and $C_r$, are determined, and with reference again to FIG. 2, the calibration data 220 stored in the memory 216 of the MIMO radar system 100 can be updated to with the determined transmit and receive calibration matrices, $C_t$ and $C_r$, and the ranging and detection code 240 can be updated to utilize the determined transmit and receive calibration matrices, $C_t$ and $C_r$, in place of the full calibration matrix C. The memory 216 of the MIMO radar system 100 can be updated, for example, wirelessly by an over-the-air (OTA) software updating system. Additionally or alternatively, the memory 216 of the MIMO radar system 100 can be updated by a wired connection, such as a wired connection available at an automotive repair facility or dealership authorized to update the software and memory 216, including the ranging and detection code 240 and the calibration data 220, of the MIMO radar system 100 and vehicle 102. Once updated, the MIMO radar system 100 can then perform ranging and objection detection using the newly updated transmit and receive calibration matrices, $C_t$ and $C_r$.

Figure 6:
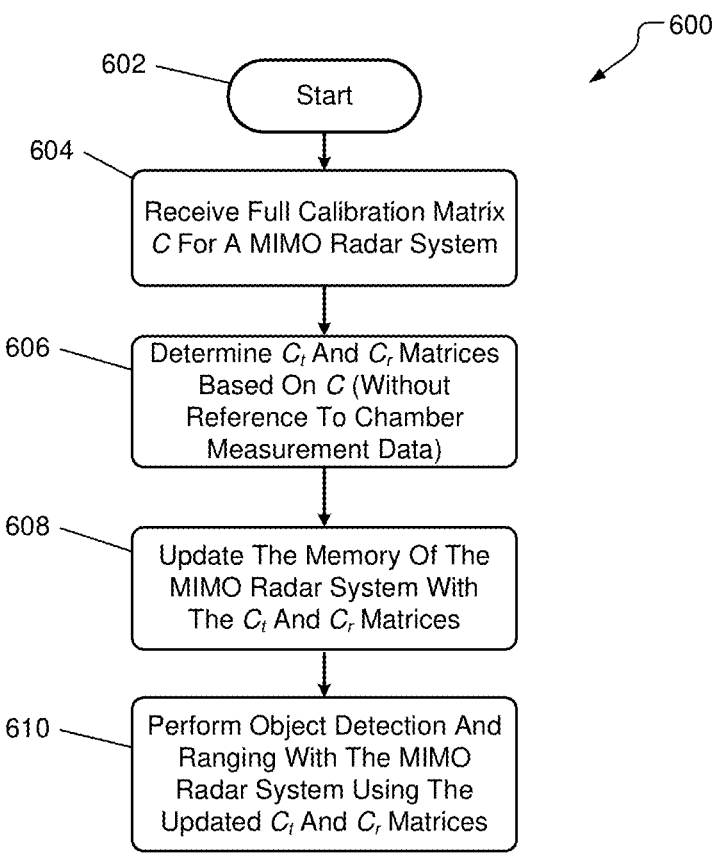
FIG. 6 illustrates a method for updating a MIMO radar system with independent transmit and receive calibration matrices in accordance with the present disclosure.
Figure 7:
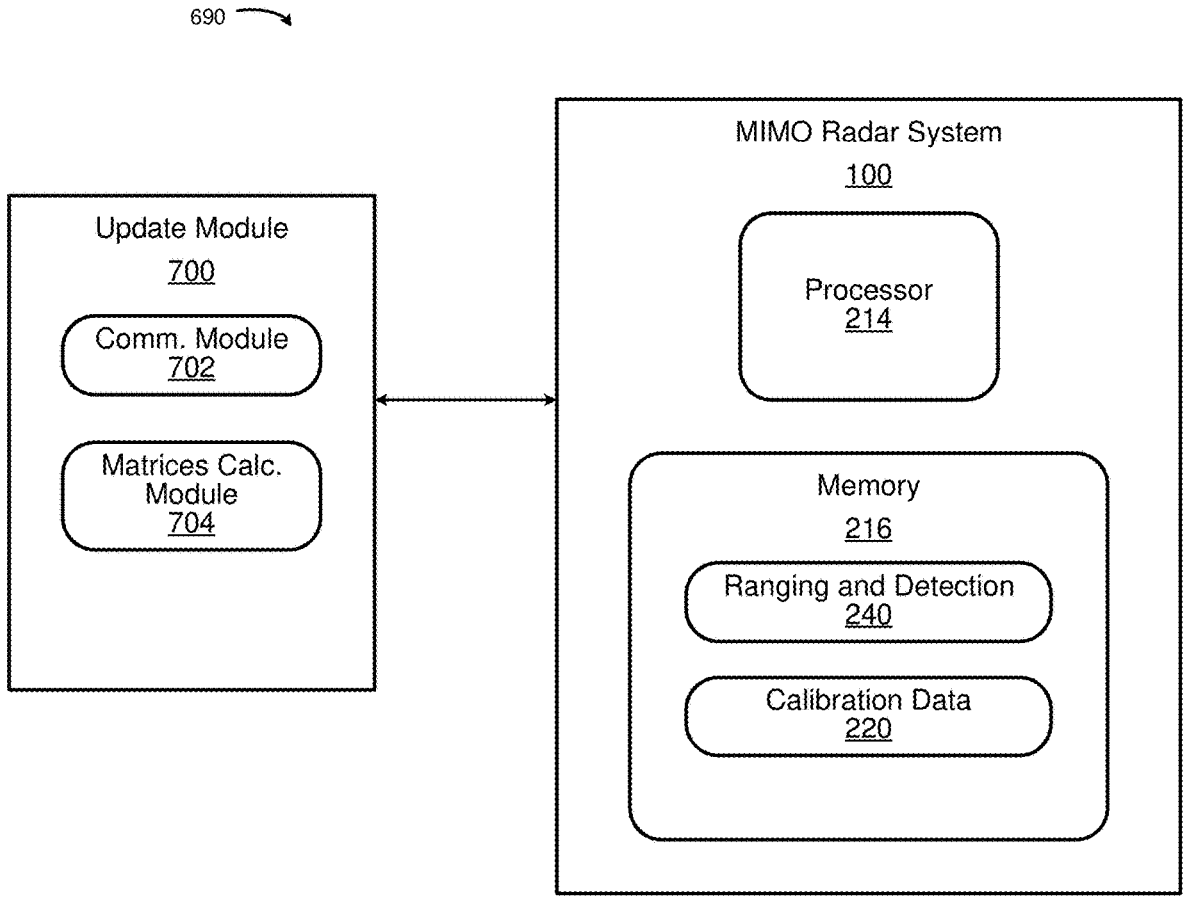
FIG. 7 illustrates a system for updating a MIMO radar system with independent transmit and receive calibration matrices in accordance with the present disclosure.

With reference to FIGS. 6 and 7, a method 600 for updating a MIMO radar system in accordance with the present disclosure is illustrated in FIG. 6 and a system 690 for updating a MIMO radar system in accordance with the present disclosure is illustrated in FIG. 7. The method 600, for example, can be performed in part by an update module 700 of the system 690 illustrated in FIG. 7. The method 600 starts at 602. The update module 700 can include a computing device having a processor and memory configured to perform and implement the described functionality. The update module 700 includes a communication module 702 and a matrices calculation module 704. The update module 700 can communicate with the MIMO radar system 100 via a wired or wireless communication connection. Some or all of the processing performed by the update module 700 can, for example, be performed remotely from the MIMO radar system 100 via a cloud computing system in communication with the MIMO radar system 100 over a network, such as the Internet.

At 604, the update module 700 receives the full calibration matrix C for the MIMO radar system 100. The full calibration matrix C can be retrieved from the calibration data 220 stored in the memory 216 of the MIMO radar system 100 via the communication module 702. Additionally or alternatively, the full calibration matrix C can be retrieved from a manufacturer or service provider of the MIMO radar system 100. For example, a manufacturer or service provider of the MIMO radar system 100 may store an archived copy of the full calibration matrix C for the MIMO radar system 100.

At 606, the matrices calculation module 704 calculates and determines the transmit and receive calibration matrices, $C_t$ and $C_r$ from the full calibration matric C, as discussed in detail above, without reference to chamber measurement data for the MIMO radar system 100.

At 608, the communication module 702 of the update module 700 communicates the transmit and receive calibration matrices, $C_t$ and $C_r$, to the MIMO radar system 100 for storage in the memory 216 as updated calibration data 220. The communication module 702 of the update module 700 can also communicate updated operating code for the MIMO radar system 100 that, when executed by the processor 214 of the MIMO radar system, configures the MIMO radar system to perform calibration using the transmit and receive calibration matrices, $C_t$ and $C_r$. In response to receiving the updated operation code, the MIMO radar system 100 installs the updated operating code accordingly and executes the updated operating code to perform calibration using the transmit and receive calibration matrices, $C_t$ and $C_r$.

At 610, the MIMO radar system 100 then performs object detection and ranging using the newly updated transmit and receive calibration matrices, $C_t$ and $C_r$.

In this way, the present disclosure provides methods and systems for determining independent transmit and receive matrices, $C_t$ and $C_r$, for a MIMO radar system 100 based on an existing/known full calibration matrix C for the MIMO radar system 100 and without the need to reference or determine chamber measurement data for the MIMO radar system 100. In this way, the independent transmit and receive matrices, $C_t$ and $C_r$, for existing MIMO radar systems can be determined for previously manufactured MIMO radar systems that are already in the field and in use without the need to generate or determine chamber measurement data for the MIMO radar system. Because the existing full calibration matrix C for the MIMO radar system 100 is already known and stored in the MIMO radar system and/or, for example, by the MIMO radar system manufacturer or developer, the independent transmit and receive matrices, $C_t$ and $C_r$, can be developed based on the existing full calibration matrix C for the MIMO radar system 100. The MIMO radar system 100 in the field can then be updated with a software update to replace the full calibration matrix C stored in memory with the independent transmit and receive matrices, $C_t$ and $C_r$. In addition, the processing software stored in the memory of the MIMO radar system 100 can be updated with new processing software to calibrate and compensate the antenna responses of the MIMO radar system 100 based on the independent transmit and receive matrices, $C_t$ and $C_r$.

The foregoing description of the embodiments has been provided for purposes of illustration and description and is not intended to be exhaustive or to limit the disclosure. Individual elements or features of a particular embodiment are generally not limited to that particular embodiment, but, where applicable, are interchangeable and can be used in another embodiment, even if not specifically shown or described. The various embodiments may also be varied in many ways. Such variations are not to be regarded as a departure from the disclosure, and all such modifications are intended to be included within the scope of the disclosure. Although each of the embodiments is described above as having certain features, any one or more of those features described with respect to any embodiment of the disclosure can be implemented in and/or combined with features of any other embodiments, even if that combination is not explicitly described. In other words, the described embodiments are not mutually exclusive, and permutations of one or more embodiments with one another remain within the scope of this disclosure.

Example embodiments are provided so that this disclosure will be thorough and will fully convey the scope to those who are skilled in the art. Specific details are set forth, including examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference and not to indicate a fixed order.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard (including Core Specification versions 3.0, 4.0, 4.1, 4.2, 5.0, and 5.1 from the Bluetooth SIG) from the Bluetooth Special Interest Group (SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media.

The apparatuses and methods described in this application may be partially or fully implemented by a special purpose computer created by configuring a general-purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method comprising:

receiving, with at least one processor, a full calibration matrix for a multiple-input multiple-output (MIMO) radar system having N physical transmit channels, M physical receive channels, and N×M virtual transmit-receive channels, the full calibration matrix being an NM×NM complex matrix of calibration values previously generated based on chamber measurement data for the MIMO radar system;

determining, with the at least one processor, a transmit calibration matrix and a receive calibration matrix based on the full calibration matrix, the transmit calibration matrix being an N×N complex matrix of calibration values for the MIMO radar system and the receive calibration matrix being an M×M complex matrix of calibration values for the MIMO radar system; and communicating, with the at least one processor, the transmit calibration matrix and the receive calibration matrix to the MIMO radar system;

wherein the MIMO radar system uses the calibration values of the transmit calibration matrix and receive calibration matrix to compensate antenna responses to adjust for physical characteristics of the MIMO radar system while performing at least one of ranging and detection of an object in an environment of the MIMO radar system.

2. The method of claim 1, wherein determining, with the at least one processor, the transmit calibration matrix and the receive calibration matrix includes using singular value decomposition of a permuted version of the full calibration matrix to determine a one-dimensional N×N array corresponding to a vector version of the transmit calibration matrix and a one-dimensional M×M array corresponding to a vector version of the receive calibration matrix and reforming the one-dimensional N×N array and the one-dimensional M×M array into the transmit calibration matrix and the receive calibration matrix, respectively.

3. The method of claim 1, wherein the MIMO radar system is installed in a vehicle and the communicating, with the at least one processor, the transmit calibration matrix and the receive calibration matrix to the MIMO radar system includes wirelessly communicating the transmit calibration matrix and the receive calibration matrix to the MIMO radar system.

4. The method of claim 1, wherein the full calibration matrix is previously stored in a memory of the MIMO radar system during manufacture of the MIMO radar system and, upon receiving the transmit calibration matrix and the receive calibration matrix, the MIMO radar system removes the full calibration matrix from the memory of the MIMO radar system and stores the transmit calibration matrix and the receive calibration matrix in the memory of the MIMO radar system.

5. The method of claim 1, wherein the determining, with the at least one processor, the transmit calibration matrix and the receive calibration matrix is performed based on a nearest Kronecker product (NKP) problem that includes minimizing the following function with respect to the transmit calibration matrix and the receive calibration matrix:

$$f(C_t, C_r) = \|C - C_t \otimes C_r\|_F$$

wherein C is the full calibration matrix, $C_t$ is the transmit calibration matrix, and $C_r$ is the receive calibration matrix.

6. The method of claim 1, wherein the physical characteristics of the MIMO radar system include at least one of mutual coupling of transmit/receive components of the MIMO radar system, differences in transmission and receive circuitry of the MIMO radar system, and differences in transmission and receive line lengths for each of the N physical transmit channels and the M physical receive channels.

7. A system comprising at least one processor and memory configured to:

receive a full calibration matrix for a multiple-input multiple-output (MIMO) radar system having N physical transmit channels, M physical receive channels, and N×M virtual transmit-receive channels, the full calibration matrix being an NM×NM complex matrix of calibration values previously generated based on chamber measurement data for the MIMO radar system;

determine a transmit calibration matrix and a receive calibration matrix based on the full calibration matrix, the transmit calibration matrix being an N×N complex matrix of calibration values for the MIMO radar system and the receive calibration matrix being an M×M complex matrix of calibration values for the MIMO radar system; and communicate the transmit calibration matrix and the receive calibration matrix to the MIMO radar system;

wherein the MIMO radar system uses the calibration values of the transmit calibration matrix and receive calibration matrix to compensate antenna responses to adjust for physical characteristics of the MIMO radar system while performing at least one of ranging and detection of an object in an environment of the MIMO radar system.

8. The system of claim 7, wherein the at least one processor and memory are configured to determine the transmit calibration matrix and the receive calibration matrix by using singular value decomposition of a permuted version of the full calibration matrix to determine a one-dimensional N×N array corresponding to a vector version of the transmit calibration matrix and a one-dimensional M×M array corresponding to a vector version of the receive calibration matrix and reforming the one-dimensional N×N array and the one-dimensional M×M array into the transmit calibration matrix and the receive calibration matrix, respectively.

9. The system of claim 7, wherein the MIMO radar system is installed in a vehicle and the at least one processor and memory are configured to communicate the transmit calibration matrix and the receive calibration matrix to the MIMO radar system by wirelessly communicating the transmit calibration matrix and the receive calibration matrix to the MIMO radar system.

10. The system of claim 7, wherein the full calibration matrix is previously stored in a memory of the MIMO radar system during manufacture of the MIMO radar system and, upon receiving the transmit calibration matrix and the receive calibration matrix, the MIMO radar system removes the full calibration matrix from the memory of the MIMO radar system and stores the transmit calibration matrix and the receive calibration matrix in the memory of the MIMO radar system.

11. The system of claim 7, wherein the at least one processor and memory are configured to determine the transmit calibration matrix and the receive calibration matrix based on a nearest Kronecker product (NKP) problem that includes minimizing the following function with respect to the transmit calibration matrix and the receive calibration matrix:

$$f(C_t, C_r) = \|C - C_t \otimes C_r\|_F$$

wherein C is the full calibration matrix, $C_t$ is the transmit calibration matrix, and $C_r$ is the receive calibration matrix.

12. The system of claim 7, wherein the physical characteristics of the MIMO radar system include at least one of mutual coupling of transmit/receive components of the MIMO radar system, differences in transmission and receive circuitry of the MIMO radar system, and differences in transmission and receive line lengths for each of the N physical transmit channels and the M physical receive channels.

13. A method of updating calibration data stored in a memory of a multiple-input multiple-output (MIMO) radar system having N physical transmit channels, M physical receive channels, and N×M virtual transmit-receive channels, the calibration data including a full calibration matrix, the full calibration matrix being an NM×NM complex matrix of calibration values previously generated based on chamber measurement data for the MIMO radar system, the method comprising:

receiving, with at least one processor, the full calibration matrix for MIMO radar system;

determining, with the at least one processor, a transmit calibration matrix and a receive calibration matrix based on the full calibration matrix, the transmit calibration matrix being an N×N complex matrix of calibration values for the MIMO radar system and the receive calibration matrix being an M×M complex matrix of calibration values for the MIMO radar system;

communicating, with the at least one processor, the transmit calibration matrix and the receive calibration matrix to the MIMO radar system; and communicating, with the at least one processor, updated operating code that configures the MIMO radar system to perform calibration using the transmit calibration matrix and the receive calibration matrix to the MIMO radar system;

wherein:

the MIMO radar system uses the calibration values of the transmit calibration matrix and receive calibration matrix to compensate antenna responses to adjust for physical characteristics of the MIMO radar system while performing at least one of ranging and detection of an object in an environment of the MIMO radar system;

in response to receiving the transmit calibration matrix and the receive calibration matrix, the MIMO radar system is configured to remove the full calibration matrix from the calibration data stored in the memory and to store the transmit calibration matrix and the receive calibration matrix in the memory; and in response to receiving the updated operating code, the MIMO radar system is configured to install the updated operation code to perform calibration using the transmit calibration matrix and the receive calibration matrix to the MIMO radar system.

14. The method of claim 13, wherein determining, with the at least one processor, the transmit calibration matrix and the receive calibration matrix is performed by using singular value decomposition of a permuted version of the full calibration matrix to determine a one-dimensional N×N array corresponding to a vector version of the transmit calibration matrix and a one-dimensional M×M array corresponding to a vector version of the receive calibration matrix and reforming the one-dimensional N×N array and the one-dimensional M×M array into the transmit calibration matrix and the receive calibration matrix, respectively.

15. The method of claim 13, wherein the MIMO radar system is installed in a vehicle and the communicating, with the at least one processor, the transmit calibration matrix and the receive calibration matrix to the MIMO radar system includes wirelessly communicating the transmit calibration matrix and the receive calibration matrix to the MIMO radar system.

16. The method of claim 13, wherein the determining, with the at least one processor, the transmit calibration matrix and the receive calibration matrix is performed based on a nearest Kronecker product (NKP) problem that includes minimizing the following function with respect to the transmit calibration matrix and the receive calibration matrix:

$$f(C_t, C_r) = \|C - C_t \otimes C_r\|_F$$

wherein C is the full calibration matrix, $C_t$ is the transmit calibration matrix, and $C_r$ is the receive calibration matrix.

17. The method of claim 13, wherein the physical characteristics of the MIMO radar system include at least one of mutual coupling of transmit/receive components of the MIMO radar system, differences in transmission and receive circuitry of the MIMO radar system, and differences in transmission and receive line lengths for each of the N physical transmit channels and the M physical receive channels.

\* \* \* \* \*